Aug. 27, 1940.  I. H. DALE  2,213,083
SYSTEM OF TEMPERATURE CONTROL
Filed Dec. 4, 1939
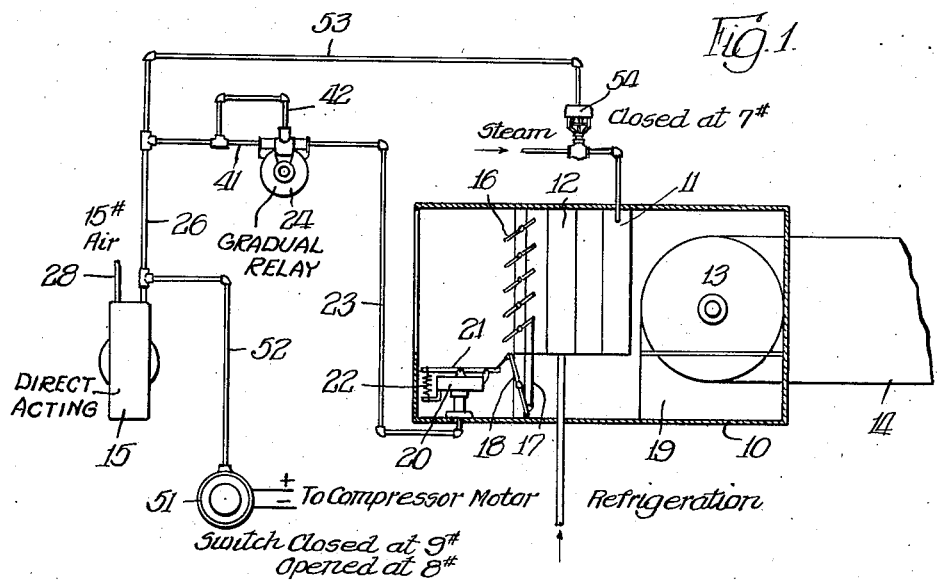
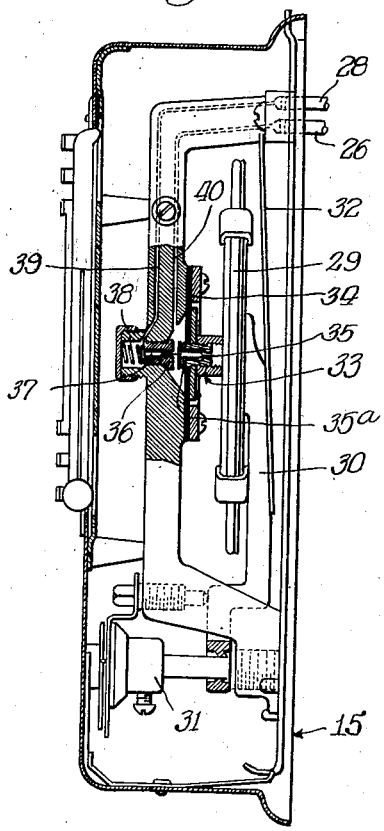
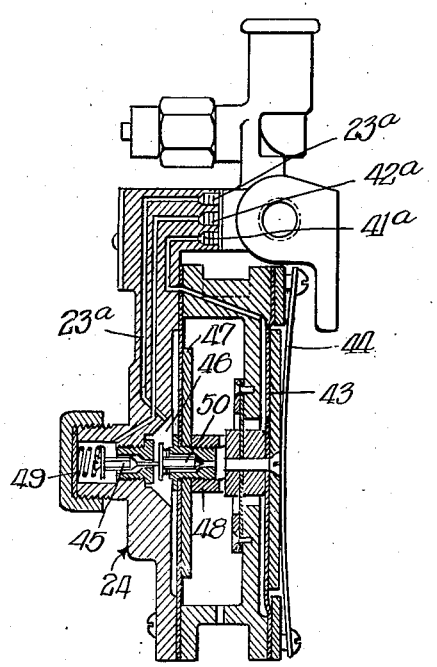
INVENTOR.
Irving Hamilton Dale,
BY
ATTORNEY.

Patented Aug. 27, 1940

2,213,083

UNITED STATES PATENT OFFICE 2,213,083

SYSTEM OF TEMPERATURE CONTROL

Irving Hamilton Dale, Melrose, Mass., assignor to The Powers Regulator Company, Chicago, Ill., a corporation of Illinois Application December 4, 1939, Serial No. 307,423

8 Claims. (Cl. 257—3)

My invention relates to temperature control for enclosed spaces and particularly to novel means for utilizing combined heating and cooling arrangements, such as disclosed in my copending application, Serial No. 307,422 filed of even date herewith.

In many industrial operations, as well as in some cases involving air conditioning for living comfort, it is desirable to provide for the maintenance of a substantial exact temperature at all times, including those periods when the outdoor temperature is in the zone between 70 and 80. Ordinarily it is considered satisfactory for personal comfort if a relatively wide differential of 8 or 10 degrees is allowed between the supplying of heat at the lower limit and the cooling of the air at the upper limit. As stated, however, there is a demand for mechanism by which the temperature may be maintained at a substantially constant predetermined point without a wide differential. In order to bring about a maintenance of such a constant temperature, it is necessary to provide automatic means that will not only provide heating and cooling means as required, but that may control the delivery of air to the space whose temperature is to be controlled without elaborate mechanism. Preferably the same mechanism without duplication should be provided for both heating and cooling and in the system here disclosed, I have provided a single thermostat for accomplishing the purpose. To this is added a reverse acting gradual relay that serves to modify the thermostatic action in order to accomplish the desired result.

The invention will be more readily understood by reference to the accompanying drawing; in which, Fig. 1 is a diagrammatic view of apparatus arranged to accomplish the stated result;

Fig. 2 is a sectional view through a direct acting thermostat such as required; and, Fig. 3 is a sectional view through a relay installed in the air line for operation in conjunction with the thermostat.

In the drawing I have illustrated a casing 10 containing a heating coil 11 and a cooling coil 12. A fan located in the casing 13 serves to deliver air through a duct 14 to a space, the temperature of which is to be controlled, and within which space the thermostat 15 is located.

As one example of means for controlling the air passing over the heat exchange elements 11—12, I show a louvre damper 16 connected by a link 17 to a damper 18 that controls a passage 19 through which the air for the fan may pass, rather than over the heat exchange element. As a means for controlling the dampers to close one as the other is opened, I provide the damper motor 20 which may be of common construction and arranged to operate in such manner that air pressure exerted on the motor will cause the arm 21 to rise against the tension of the spring 22 and thus to swing the damper 18 toward open position. This will result in a corresponding closing action of the damper 16. Air under pressure is supplied to the motor 20 through the conduit 23 in which conduit is placed the thermostat 15 and a reverse acting gradual relay 24 illustrated in detail in Fig. 3.

Since the action is initiated by the thermostat 15, this will first be described, a cross sectional view through which is provided in Fig. 2. The term "direct acting" is intended to define an instrument so arranged that it will pass air at an increased pressure on an increase in temperature effective on the instrument.

The direct acting thermostat shown in Fig. 2 is of a well known form and comprises an expansible thermostatic disc 29 mounted on a support 30 having adjusting means 31 applied thereto and backed by a spring 32. An assembly 33 is mounted on a flexible diaphragm 34 and provides a seat for a valve 35. This valve member is connected by a thrust engagement to a second valve 37 which is resisted by a spring 38, the valve being within a second assembly 36.

The supply pipe 28 communicates with a passage 39 open to the space in the rear of the valve 37 while the pipe 26,—that is, the return pipe,— communicates with a passage 40 in communication with the space behind the diaphragm 34.

The operation is as follows, assuming that there is a supply of air at 15 lbs. pressure in the pipe 28:

At a temperature less than that for which the thermostat is set, the disc 35 will be contracted, the supply valve 37 will be closed by its spring 38 and the exhaust valve 35 will be open by reason of its spring 35a. As the temperature within the space increases, the disc will expand, first closing the exhaust valve 35 and then, through contact between the valve 35 and the stem of the valve 37, tend to open the valve 37 admitting air into the return pipe 26.

At a point near the relay the pipe 26 provides two branches 41—42, these terminating in inlet passages 41a—42a, indicated in Fig. 3. The passage 23a communicates with the pipe 23 that is connected to the damper motor.

The construction and operation of the relay is as follows:

As air under pressure is delivered from the thermostat due to a rise in temperature, such air under pressure is admitted through the passage 41a to the space in front of a diaphragm 43 backed by a stiff spring 44. In the position of the parts shown in Fig. 3, pressure alongside the diaphragm 43 is insufficient to displace the diaphragh and consequently whatever pressure there is in the line 26, passes through the passage 42a past the valve 45 into the chamber 46, thence out through passage 23a to the damper motor.

However, as an increased pressure of air is delivered from the thermostat 15 due to a rise in temperature, the pressure effective on the diaphragm 43 will be increased to a point where the force of the spring 44 will be overcome, it being remembered that like pressure is being exerted against the diaphragm 47 that forms one side of the chamber 46. This movement will bring about a bodily movement of the valve assembly 48 to the right, resulting in first closing the valve 45 through the action of the spring 49, then if the movement continues, finally opening the valve 50 so that the pressure within the chamber 46, and consequently within the pipe 23 and the damper motor 20, will be exhausted.

With the thermostat 15 set for 70° the pressure in the lines 26 and 23 will be as follows:

| Temperature at 15, degrees | Pressure at 26 | Pressure at 23 |
|---|---|---|
|  | Pounds | Pounds |
| 66 | 0 | 0 |
| 67 | 1 | 1 |
| 68 | 3 | 3 |
| 69 | 5 | 5 |
| 70 | 7 | 7 |
| 70½ | 8 | 7 |
| 71 | 9 | 6 |
| 72 | 11 | 4 |
| 73 | 13 | 2 |
| 74 | 15 | 0 |

It is assumed that the damper motor is so arranged that a pressure of seven pounds per square inch is sufficient to move the damper 16 to its minimum closed position and the damper 17 to its maximum open position. Thus it will be seen that when the temperature arrives at 70° the air will be by-passed through the passage 19 and not delivered through the heat exchange elements. Further, it will be seen that as the temperature rises, a reverse action of the parts will take place; that is, beginning at 71° the pressure effective on the damper motor will be progressively lessened until at 74° there will be no pressure in the line 23 and the damper 18 will be closed and the damper 16 opened.

In order to provide for automatic supply of a heating and cooling medium as required in order to maintain a desired temperature, I provide an electro-pneumatic switch 51 of common form and so arranged that when the pressure acting thereon equals nine pounds per square inch, the switch will be closed and a compressor motor will be started by means of which refrigeration will be supplied to the coils 12 within the casing. This switch is so arranged that it is opened when the pressure falls to eight pounds per square inch, which according to the foregoing schedule will be at a temperature of 70½°. This switch 51 is connected through a branch pipe 52 to the outlet or return line pipe 26 from the thermostat.

Also connected to the line 26 through a pipe 53 is a diaphragm valve 54 located in a steam line to the heating coil 11, this diaphragm valve being set to close at the pressure of seven pounds.

Thus it will be seen that as the temperature reaches 70° the supply of steam for heating purposes will be interrupted and as it reaches 71° the compressor motor will be started for supplying a cooling medium, further that as the temperature begins to drop in the space, the compressor motor will be stopped at a temperature of 70½° and at a temperature of 69°, the steam valve will begin to open.

While I have shown apparatus by which the air for conditioning the space may be by-passed, it will be understood that a single volume damper may be used for increasing or reducing the amount of air being delivered to the space. In the first instance, an equal volume will be delivered at all times while in the second instance the volume of air will be varied from time to time. It will be understood also that the thermostat, together with the various switches and valves may be adjusted to open or close at different pressure as desired in order to maintain certain desired temperatures.

An important advantage in connection with the system here disclosed is in that there is no constant waste of air. No air is lost except that which is exhausted in order to permit the return of the operating motor to idle position.

I claim:

1. In a temperature control system for an enclosed space, the combination of heat exchange elements for alternately supplying heat to and withdrawing heat from air, a damper for controlling the passage of air over said elements, a damper motor and a conduit connected thereto, a thermostat in said conduit arranged to pass air at progressively increasing pressure following progressively increasing temperature in the space, means in the conduit between the thermostat and motor arranged to pass air from the thermostat to the motor up to a pressure sufficient to operate the motor to so actuate the damper as to pass a maximum volume of air over said elements, and thereafter on a continued rise of temperature to progressively reduce the pressure of air effective on the motor to a point where said damper is moved to a position of minimum passage of air over said elements.

2. In a temperature control system for an enclosed space, the combination of heat exchange elements for alternately supply heat to and withdrawing heat from air, a damper for controlling the passage of air over said elements, a damper motor and a conduit connected thereto, a thermostat in said conduit arranged to pass air at progressively increasing pressure following progressively increasing temperature in the space, means in the conduit between the thermostat and motor arranged to pass air from the thermostat to the motor up to a pressure sufficient to operate the motor to so actuate the damper as to pass a maximum volume of air over said elements, and thereafter on a continued rise of temperature to progressively reduce the pressure of air effective on the motor to a point where said damper is moved to a position of minimum passage of air over said elements, and means also connected to the outlet from the thermostat for automatically interrupting the supply of heat and starting the supply of refrigerant to said elements at predetermined pressures delivered by said thermostat.

3. In a temperature control system for an enclosed space, the combination of heat exchange elements for alternately supplying heat to and withdrawing heat from air, a damper for controlling the passage of air over said elements, a damper motor and a conduit connected thereto, a thermostat in said conduit arranged to pass air at progressively increasing pressure following progressively increasing temperature in the space, said motor being arranged to operate on an increase of pressure acting thereon to open the damper to permit an increased volume of air to pass over said elements, a relay in the conduit between the thermostat and motor, said relay being arranged to pass air from the thermostat to the motor up to a pressure that will move the damper to maximum opening, and thereafter on a further increase of pressure to act to progressively reduce the pressure effective on said motor.

4. In a temperature control system for an enclosed space, the combination of heat exchange elements for alternately supplying heat to and withdrawing heat from air, a damper for controlling the passage of air over said elements, a damper motor and a conduit connected thereto, a thermostat in said conduit arranged to pass air at progressively increasing pressure following progressively increasing temperatures in the space, said motor being arranged to operate on an increase of pressure acting thereon to open the damper to permit an increased volume of air to pass over said elements, a relay in the conduit between the thermostat and motor, said relay being arranged to pass air from the thermostat to the motor up to a pressure that will move the damper to maximum opening, and thereafter on a further increase of pressure to act to progressively reduce the pressure effective on said motor, and means also connected to the outlet from the thermostat for automatically interrupting the supply of heat and starting the supply of refrigerant to said elements at predetermined pressure delivered by said thermostat.

5. In a temperature control system for an enclosed space, the combination of heat exchange elements for alternately supplying heat to and withdrawing heat from air, a damper for controlling the passage of air over said elements, a damper motor and a conduit connected thereto, a thermostat in said conduit arranged to pass air at progressively increasing pressure following progressively increasing temperature in the space, said motor being arranged to operate on an increase of pressure acting thereon to open the damper to permit an increased volume of air to pass over said elements, a relay in the conduit between the thermostat and motor, said relay being inactive and operating to transmit to the motor air of the pressure delivered by the thermostat until a pressure is reached at which the damper is at maximum opening, said relay operating thereafter on an increase of pressure from the thermostat to progressively reduce the pressure effective on the motor.

6. In a temperature control system for an enclosed space, the combination of heat exchange elements for alternately supplying heat to and withdrawing heat from air, a damper for controlling the passage of air over said elements, a damper motor and a conduit connected thereto, a thermostat in said conduit arranged to pass air at progressively increasing pressure following progressively increasing temperature in the space, said motor being arranged to operate on an increase of pressure acting thereon to open the damper to permit an increased volume of air to pass over said elements, a relay in the conduit between the thermostat and motor, said relay being inactive and operating to transmit to the motor air of the pressure delivered by the thermostat until a pressure is reached at which the damper is at maximum opening, said relay operating thereafter on an increase of pressure from the thermostat to progressively reduce the pressure effective on the motor, and means also connected to the outlet from the thermostat for automatically interrupting the supply of heat and starting the supply of refrigerant to said elements at predetermined pressures delivered by said thermostat.

7. In a temperature control system for an enclosed space, the combination of heat exchange elements for alternately supplying heat to and withdrawing heat from air, a damper for controlling the passage of air over said elements, a damper motor and a conduit connected thereto, a thermostat in said conduit arranged to pass air at progressively increasing pressure following progressively increasing temperature in the space, means in the conduit between the thermostat and motor arranged to pass air from the thermostat to the motor up to a pressure sufficient to operate the motor to so actuate the damper as to pass a maximum volume of air over said elements, and thereafter on a continued rise of temperature to progressively reduce the pressure of air effective on the motor to a point where said damper is moved to a position of minimum passage of air over said elements, a heat control valve, means connected to the thermostat for operating said valve to close the same at the pressure delivered by the thermostat at its temperature setting.

8. In a temperature control system for an enclosed space, the combination of heat exchange elements for alternately supplying heat to and withdrawing heat from air, a damper for controlling the passage of air over said elements, a damper motor and a conduit connected thereto, a thermostat in said conduit arranged to pass air at progressively increasing pressure following progressively increasing temperature in the space, means in the conduit between the thermostat and motor arranged to pass air from the thermostat to the motor up to a pressure sufficient to operate the motor to so actuate the damper as to pass a maximum volume of air over said elements, and thereafter on a continued rise of temperature to progressively reduce the pressure of air effective on the motor to a point where said damper is moved to a position of minimum passage of air over said elements, a heat control valve, means connected to the thermostat for operating said valve to close the same at the pressure delivered by the thermostat at its temperature setting, cooling control means, and means connected to the thermostat for operating the same to start a supply of cooling medium to the heat exchange element at an increased pressure above that at which the heat element is discontinued.

IRVING HAMILTON DALE.